United States Patent [19]
Takeda et al.

[11] Patent Number: 5,467,458
[45] Date of Patent: Nov. 14, 1995

[54] OPTICAL CHARACTER READER WITH INTERNAL MEMORY AND DATA PROCESSOR

[75] Inventors: Katsunori Takeda, Nara; Shinsuke Otsuka, Kitakatsuragi; Yoshiharu Takahashi, Osaka; Hiroo Katsura, Nara; Kazuhiko Takata, Kitakatsuragi; Shoichi Maeda; Takafumi Nagato, both of Yamatokoriyama, all of Japan

[73] Assignee: Sharp Kabushiki Kaisha, Osaka, Japan

[21] Appl. No.: 885,435

[22] Filed: May 19, 1992

[30] Foreign Application Priority Data

May 21, 1991 [JP] Japan .................................. 3-116156

[51] Int. Cl.⁶ .................................................. G06F 12/08
[52] U.S. Cl. ............. 395/427; 364/237.83; 364/932.61; 364/964.6; 364/DIG. 1; 382/321
[58] Field of Search ..................... 364/200 MS, 900 MS; 395/400 MS, 424 MS

[56]  References Cited

U.S. PATENT DOCUMENTS

| | | | |
|---|---|---|---|
| 4,061,380 | 12/1977 | Carnahan et al. | 339/8 |
| 4,072,859 | 2/1978 | McWaters | 250/214 |
| 4,128,298 | 12/1978 | McMillan | 350/96.10 |
| 4,158,194 | 6/1978 | McWaters et al. | 340/146.3 |
| 4,628,532 | 12/1986 | Stone et al. | 382/21 |
| 4,642,794 | 2/1987 | Lavelle et al. | 364/900 |
| 4,646,261 | 2/1987 | Ng | 364/900 |
| 4,962,452 | 10/1990 | Nogami et al. | 364/419 |
| 5,088,038 | 2/1992 | Tanaka et al. | 364/419 |
| 5,132,901 | 7/1992 | Yokogawa | 364/419 |
| 5,199,081 | 3/1993 | Saito et al. | 395/149 |
| 5,214,583 | 5/1993 | Miike et al. | 364/419 |
| 5,222,160 | 6/1993 | Sakai et al. | 364/419 |
| 5,323,311 | 6/1994 | Fukao et al. | 364/419.02 |
| 5,351,189 | 9/1994 | Doi et al. | 364/419.02 |

OTHER PUBLICATIONS

K. Fujii et al., Japanese Laid-Open Patent Publication No. 59-165186, Laid on Sep. 18, 1984, with partial English translation.

M. Nagaishi, Japanese Laid-Open Patent Publication No. 3-51960, Laid on Mar. 6, 1991, with partial English translation.

Primary Examiner—Reba I. Elmore
Attorney, Agent, or Firm—Nixon & Vanderhye

[57]  ABSTRACT

An optical character reader is provided, which comprises an input for allowing a plurality of commends to be input; a reading device for reading recorded data; a memory having a first region for storing read date, a second region for storing character data corresponding to the read data, and a third region for storing the character dates an output device for supplying at least one of the character data stored in the second region of the memory and the character data stored in the third region of the memory to the information processing device; and a data processor, when a memory command is input from the input, which stores the read data in the first region of the memory, converts the read data which is stored in the first region of the memory into character data, and stores the character data in the second region of the memory, and when a read command is input from the input, which transfers the character data stored in the second region of the memory to the third region.

16 Claims, 12 Drawing Sheets

OPTICAL CHARACTER READER WITH INTERNAL MEMORY AND DATA PROCESSOR

BACKGROUND OF THE INVENTION

1. Field of the Invention

The present invention relates to an optical character reader which reads stored date and supplies it to an information processing equipment.

2. Description of the Prior Art

Conventionally, in this kind of optical character reader, characters, marks and the like stored on paper and other media are read and input into an information processing equipment such as a word processor or a computer. This kind of conventional optical character reader has the following problems.

(1) In the case that identical data is frequently read, it is required to read the respective date from an memory medium each time, resulting in a complicated operation.

(2) Since the optical character reader is connected to the information processing equipment via a cable, there is a limit to the use of the optical character reader.

(3) It is difficult to select and read required characters and character strings alone.

(4) A translation function is not provided.

SUMMARY OF THE INVENTION

The present invention relates to an optical character reader where in a first exemplary embodiment the device includes an input for allowing a plurality of commands to be input, a device for reading recorded data, a memory having a first region for storing the read data, a second region for storing character data corresponding to the read data and a third region for storing the character data along with a data processor responsive to an input read command for storing the read data in the first region of the memory and for converting the data stored in the first region into character data, as well as storing the character data in the second region of the memory. Moreover, the data processor in response to an input memory command transfers the character data presently stored in the second region of the memory to the third region of the memory. The first exemplary embodiment of the optical character reader further includes an output device for supplying at least one of the character data stored in the second region of the memory and the character data stored in the third region of the memory to an information processing device external to the optical character reader in response to a transmission command.

In a second exemplary embodiment, the memory in addition to including a first region for storing the read data and a second region for storing character data corresponding to the read data has a third region for storing one character which is cut out from the character data, a fourth region storing a cutout starting character produced from the input, a fifth region for storing a cutout ending character from the input and a sixth region for storing character data cut out from the character data. The second exemplary embodiment additionally includes an internal data processor for storing the read data in the first region of the memory means when a read command is input, converting the read data which is stored in the first region into character data and storing the character data in the second region of the memory, as well as cutting out one character from the character data stored in the second region, storing the character in the third region of the memory and specifying character data to be cut out from the character data stored in the second region by comparing the character stored in the third region of the memory with the cutout starting character stored in the fourth region of the memory, and the cutout ending character stored in the fifth region of the memory, as well as for storing the specified character data in the sixth region of the memory.

A third exemplary optical character reader embodiment includes a memory having a first region for storing read data, a second region for storing character data corresponding to the read data, a third region for storing character data to be removed, as well as a fourth region for storing character data in which the character data to be removed is removed from the character data. The embodiment additionally includes a data processor, which in response to a read command, stores the read data in the first region of the memory and converts the read data into character data for storage in the second region of the memory, as well as specifying character data in which the character data to be removed is removed from the data stored in the second region by comparing the character data therein with the character data to be removed. The character data to be removed is stored in the third region of the memory, and the specified character data is stored in the fourth region of the memory.

A fourth exemplary embodiment of the present invention includes a memory having a first region for storing read data, a second region for storing line data converted from the read data, as well as a third region for storing character data converted from the line data. Moreover, the fourth embodiment includes a data processor which in response to a read command stores the read data in the first region of the memory, converts the read data of the first region to one or more line data processed with a line as a unit and for storing the line data in the second region of the memory means, as well as specifying one line data from the second region of the memory on the basis of a relative position of the line data with respect to the read data and for converting the specified line data to character data for storing the character data in the third memory region.

The fifth exemplary embodiment of the present application involves a memory having a first region for storing read data, a second region for storing character data corresponding to the read data, a third region for storing character data converted from the character data and a fourth region for storing a translation dictionary. This embodiment additionally includes a data processor which in response to a read command stores read data in the first region of the memory, converts the read data of the first region into character data for storing the character data in the second region of the memory, as well as selecting character data of a specific language from the character data stored in the second region of the memory and converting the selected character data into character data of another language with reference to the translation dictionary stored in the fourth region of the memory and for storing the converted character in the third region.

Since the data once read can repeatedly be provided to the information processing equipment via an output in accordance with a command of the input means, operations in which identical date are repeatedly read from the memory medium is omitted.

In addition, in the case where the output has a converter for converting read data into an infrared signal and an read data is supplied to the information processing equipment as the infrared signal, the cable between the optical character reader and the information processing equipment is removed, and the use of the optical character reader is broadened.

Moreover, in the case where the memory has a region for storing a Cutout starting character and a cutout ending character which are input, and the data processor compares the read data with the cutout starting character and the cutout ending character, since the character string from the cutout starting character to the cutout ending character is cut out from the read date and sent out from the output, arbitrary character strings can be read by specifying the cutout starting and the cutout ending character at the input.

Furthermore, in the case that the memory has a region for storing the cutout starting character and the number of specified characters which are input, and the data processor counts the number of characters read by the reed section, since the character string corresponding to only the number of specified characters from the cutout starting character is cut out from the read data and sent out from the output, arbitrary character strings can readily be cut out and read.

In the case that the memory means has a region for previously storing data to be removed, end the data processor removes data which should be removed from the read data, since the data which should be removed from the read data is removed and sent out from the output, only required data is read.

In the case that the data processor specifies one line datum contained in the read data, since only the character string of the specified data is sent out from the output, desired character strings are readily specified and read.

In the case that the data processor selects only English from the read data, and the selected English is translated into Japanese, since the English selected from the read data is translated into Japanese and sent out from the output, the translation process is performed at the same time of the read function, resulting in an improved value added of the reader.

Thus, the invention described herein makes possible the objective of providing an optical character reader having improved operability by comprising various kinds of functions in addition to the conventional ones.

BRIEF DESCRIPTION OF THE DRAWINGS

This invention may be better understood and its numerous objects and advantages may become more readily apparent to those skilled in the art by reference to the accompanying drawings as follows.

DESCRIPTION OF THE PREFERRED EMBODIMENTS

EXAMPLES

Hereinafter, the present invention will be described by way of illustrative examples with reference to the drawings.

Figure 1:
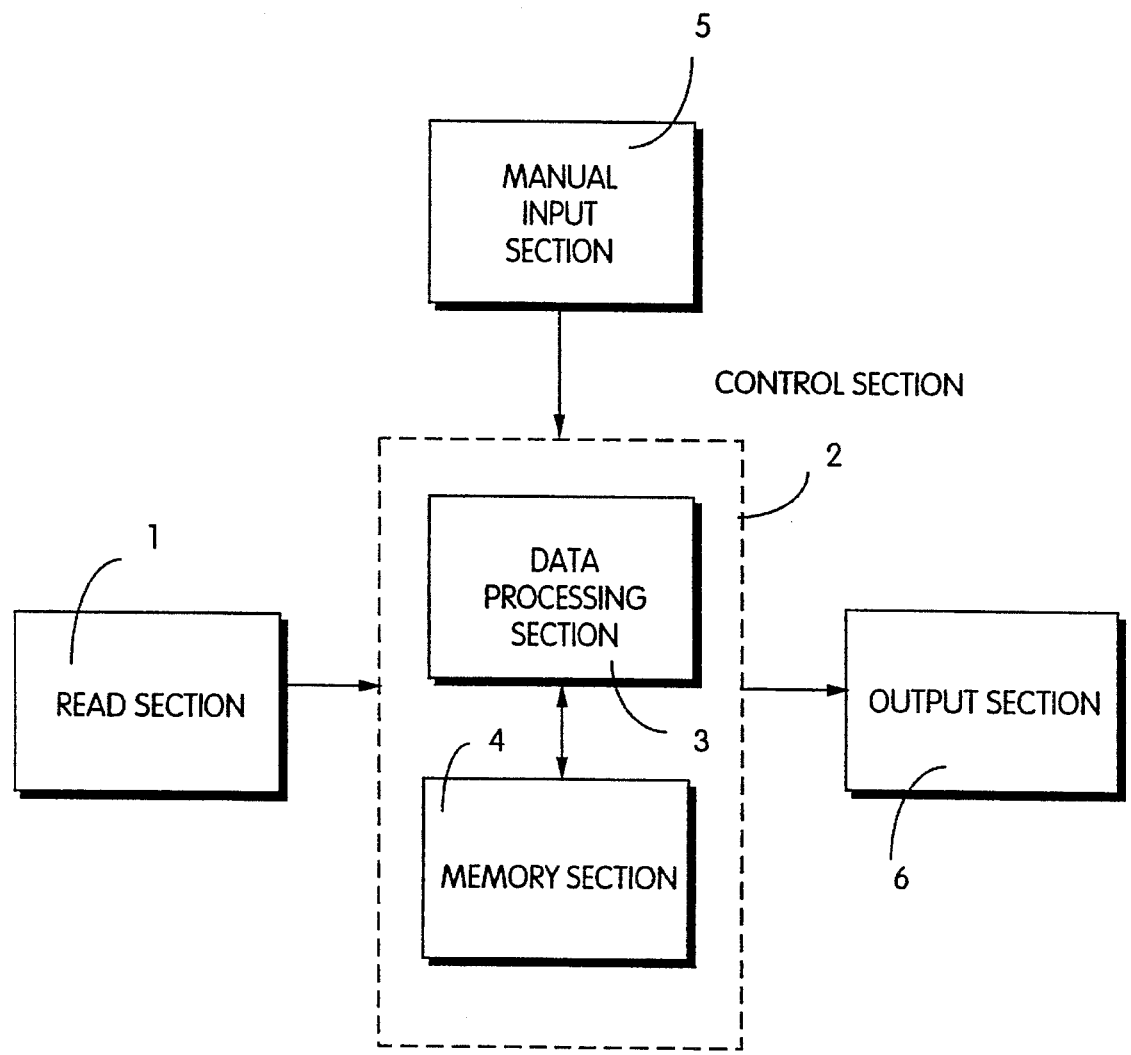
FIG. 1 is a block diagram showing a fundamental principle of the present invention.

FIG. 1 is a block diagram showing one fundamental principle of the present invention. A read section 1 recognizes data recorded in a medium as reed data. As the read section 1, for example, a CCD camera is used. A control section 2 has a data processing section 3 for processing the read data and a memory section 4 for storing the read data and the processed data. As the data processing section 3, for example, a CPU is used; and as the memory section 4, a ROM or RAM is used. A manual input section 5 commands the control section 2 a method for processing data. As the manual input section 5, for example, a key board or various kinds of switches ere used. An output section 6 supplies data processed in the control section 2 to an information processing device (not shown).

Figure 2:
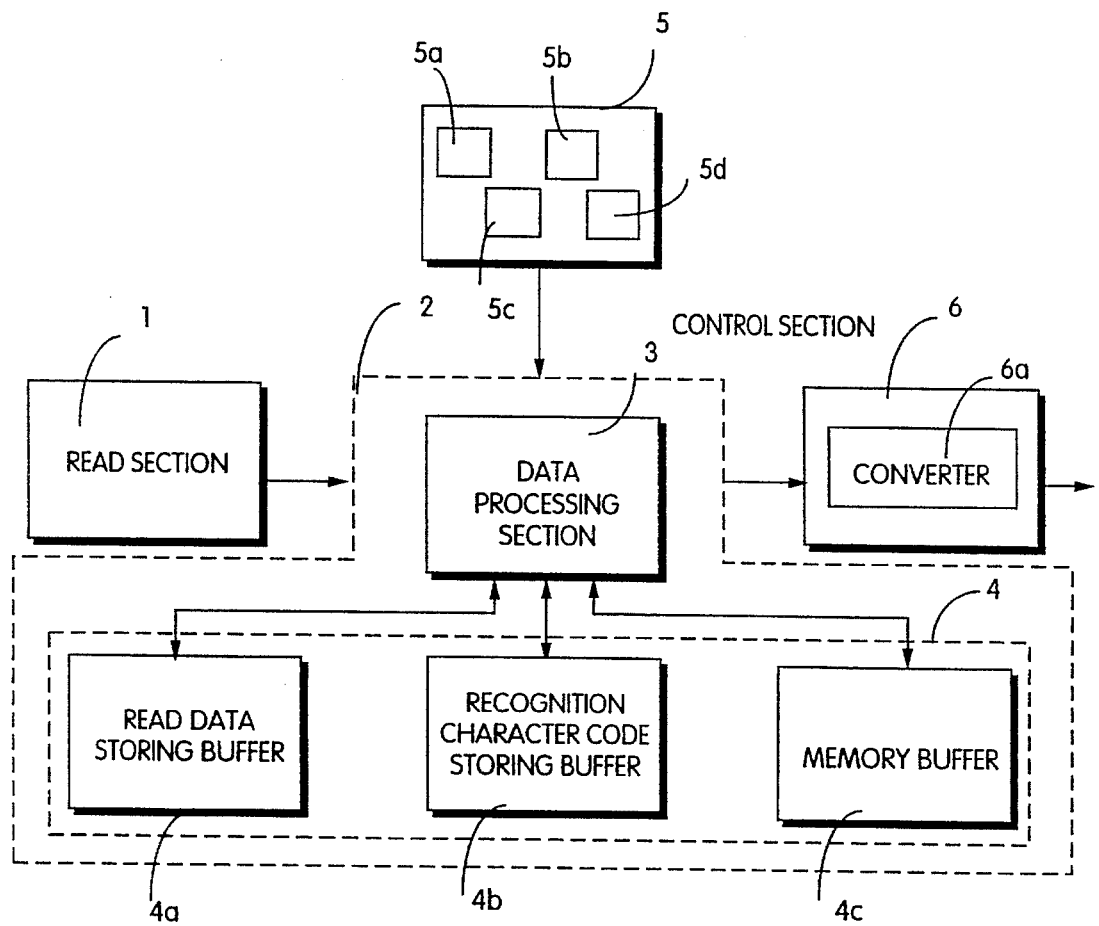
FIG. 2 is a block diagram showing a first example of the present invention.
Figure 3:
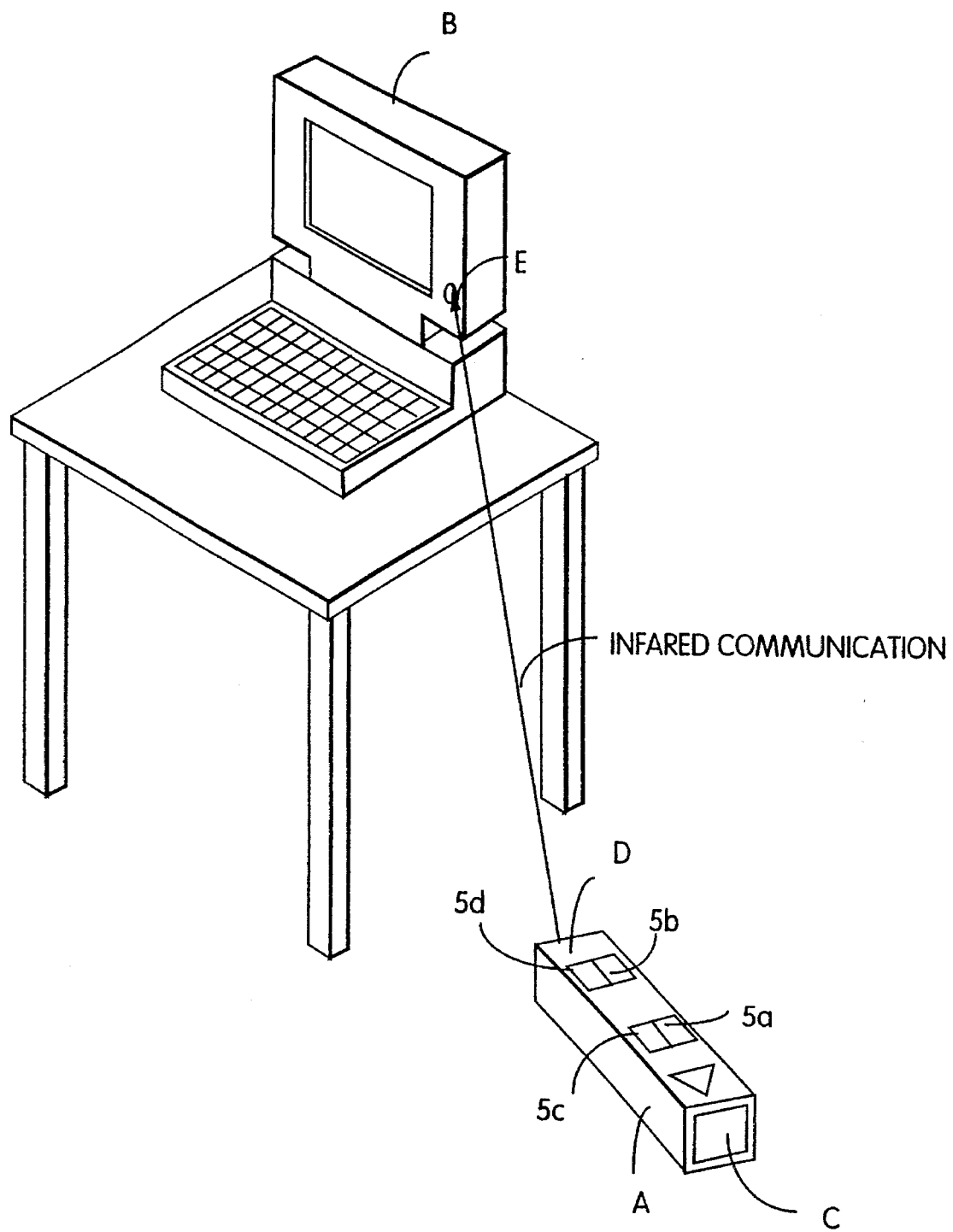
FIG. 3 is a diagram illustrating a state in which data is transmitted according to the first example.
Figure 4:
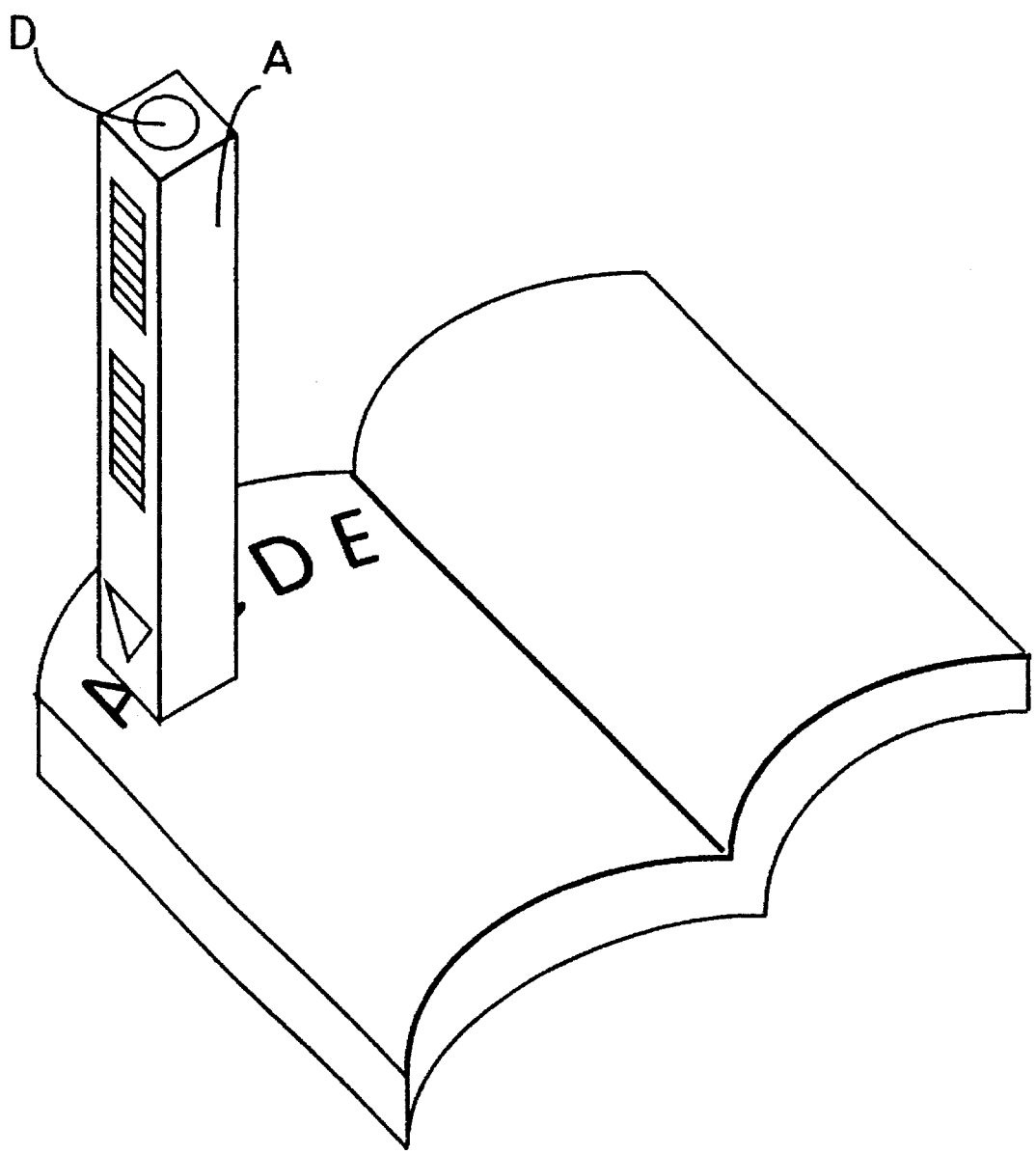
FIG. 4 is a diagram illustrating a state in which characters are read according to the first example.

FIG. 2 is a block diagram showing a first example of the present invention. FIG. 3 is a perspective view showing a state in which data is transmitted from the optical character reader to the information processing device in the first example. FIG. 4 is a perspective view showing a state in which data is read from the record medium by using the optical character reader.

In FIG. 2, the manual input section 5 comprises a read switch 5a, a transmission switch 5b, a memory switch 50, and a memory data transmission switch 5d. The memory section 4 comprises a read data storing buffer 4a, a recognition character code storing buffer 4b, and a memory buffer 4c. The output section 6 comprises a converter 6a which converts the read data processed in the data processing section 3 into an infrared signal and transmits the infrared signal to the information processing device B (FIG. 3). The same elements as those in FIG. 1 are marked with the same reference numerals, and the description thereof is omitted.

In FIGS. 3 and 4, the reference numerals a, B, C, D, and E denote an optical character reader body, an information processing device, a read window provided at one and of the body A, an infrared emission portion provided at the other and of the body a, and an infrared photo-receiving portion provided at the information processing device B.

According to this structure, as shown in FIG. 4, a user positions the body A in a desired data position and presses the read switch 5a to start reading. When the read is finished, characters which have been read are transmitted as an infrared signal to the information processing device B by pressing the transmission switch 5b. When the memory switch 5c, is pressed, the character data which is read is memorized and the memorized character data is repeatedly transmitted to the information processing device B by pressing the memory data transmission switch 5d, if required.

Next, this function will be described with reference to FIG. 2. First, the control section 2 detects that the read switch 5a is pressed. Then, the control section 2 reads data from the read section 1, stores the read data in the data storing buffer 4a, converts the read data into a character code, and stores the character code in the recognition character code storing buffer 4b. Next, when the transmission switch 5b is operated, the data processing section 3 transmits the character code of the recognition character code storing buffer 4b from the output section 6 to the information processing device B (FIG. 3).

Moreover, when the memory switch 5c is pressed, the data processing section 3 transfers the character code of the recognition character code storing buffer 4b to the memory buffer 4c to be memorized therein. When the memory data transmission switch 5d is pressed, the data processing section 3 transmits the character code of the memory buffer 4c through the output section 6 to the information processing device B. In this way, the character code once read can repeatedly be transmitted to the information processing device B.

Furthermore, since the transmission of the data from the body A to the information processing device B is performed via an infrared signal, and there is not a cable connecting therebetween, the optical character reader body A can readily be handled and its use is widened.

Figure 5:
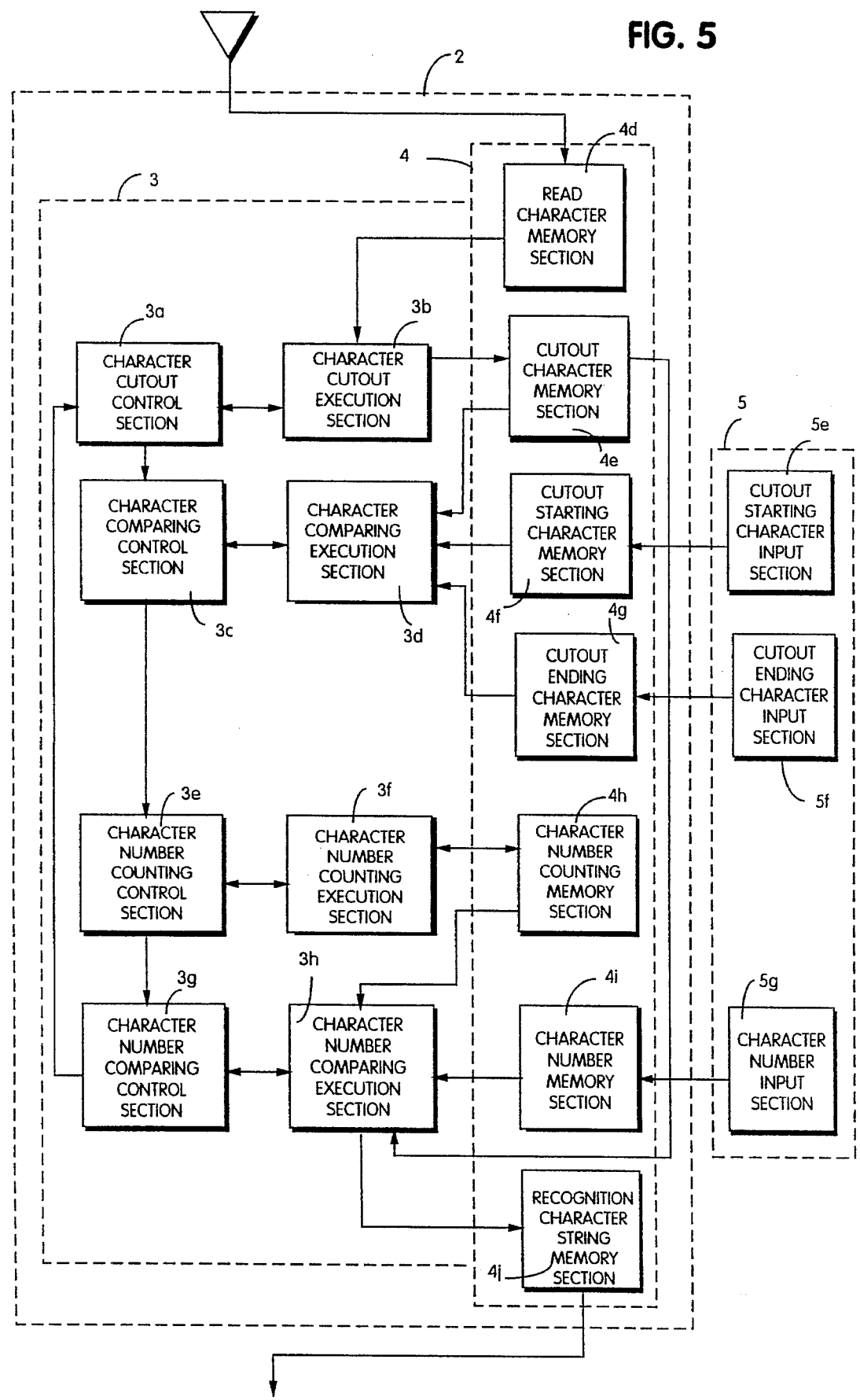
FIG. 5 is a block diagram showing main sections of a second example.

FIG. 5 is a block diagram showing main sections of a second example of the present invention. The data processing section 3 of the control section 2 comprises a character output control section 3a, a character cutout execution section 3c, a character comparing control section 3c, a character comparing execution section 3d, a character number counting control section 3e, a character number counting execution section 3f, a character number comparing control section 3g, and a character number comparing execution section 3h. The memory section 4 comprises a read character memory section 4d, a cutout character memory section 4e, a cutout starting character memory section 4f, a cutout ending character memory section 4g, a character number counting memory section 4h, a character number memory section 4i, and a recognition character string memory section 4j. The input section 5 comprises a cutout starting character input section 5e, a output ending character input section 5f, and a character number input section 5g. The same elements as those in FIG. 1 are marked with the same reference numerals, and the description thereof is omitted.

According to this structure, the read character memory section 4d stores the character string obtained in the read section 1 (FIG. 1). The character cutout control section 3a sends an execution commend or a restraint command to the character cutout execution section 3b. The character cutout execution section 3b cuts out a character string character by character. The cutout character memory section 4e stores a character cut out in the character cutout execution section 3b. The character comparing control section 3c sends an execution command or a restraint command to the character comparing execution section 3d. The character comparing execution section 3d compares a character of the cutout character memory section 4e with a character of the cutout starting character memory section 4f or the cutout ending character memory section 4g so as to check whether these characters are the same or not. The cutout starting character memory section 4f stores a character input from the cutout starting character input section 5e. The cutout ending character memory section 4g stores a character input from the cutout ending character input section 5f. The character number counting control section 3e sends an execution command or a restraint command to the character number counting execution section 3f. The character number counting execution section 3f counts the number of characters which are cut out. The character number counting memory section 4h stores the number of characters which are cut out. The character number comparing control section 3g sends an execution command or a restraint command to the character number comparing execution section 3h. The character number comparing execution section 3h compares the number of characters of the character number counting memory section 4h with those of the character number memory section 4i so as to check whether the specified number of characters are processed or not. The character number memory section 4i stores the number of characters input in the character number input section 5g. The recognition character string memory section 4j stores a character string which is cut out.

For example, in the case that seven characters "EFGHIJK" are read from a character string "ABCDEFGHIJKLMN", first, a character "E" is input as a cutout starting character from the cutout starting character input section 5e and a character "K" is input as a cutout ending character from the cutout ending character input section 5f. Here, instead of the cutout ending character "K", the maximum number of cutout characters "7" can be input from the character number input section 5g.

Next, an operator inputs a character string including a character before the character "E" (e.g. "B") through a character after the character "K" (e.g. "N"). Thus, 13 characters "BCDEFGHIJKLMN" are stored in the read character memory section 4d. When the character cutout control section 3a sends an execution command to the character cutout execution section character "B" from the character string "BCDEFGHIJKLMN" memorized in the read character memory section 4d and the character "B" is stored in the cutout character memory section 4e.

When the character comparing control section 3c sends an execution command to the character competing execution section 3d, the character comparing execution section 3d compares the character "B" of the cutout character memory section 4e with the cutout starting character "E". In the case that both characters are not identical, the character output execution section 3b cuts out a character "C" from the read character memory section 4d and the character "C" is stored in the cutout character memory section 4e. The character comparing execution section 3d compares the character "C" of the cutout character memory section 4e with the cutout staring character "E". The same operation is repeated until both characters become identical.

When the cutout starting character is not input, the character "B" which is first cut out is considered as the cutout starting character. When the cutout ending character is not input, the last character stored in the read character memory section 4d, i.e., The character "N" is considered as the cutout ending character.

When the number of characters is input instead of the cutout ending character, the cutout starting character "E" is cut out, as described above. Then, the character "E" is stored in the cutout character memory section 4e, the character number counting control section 3e sends an execution command to the character number counting execution section 3f, and the character number counting execution section 3f adds 1 to the counted number of characters of the character number counting memory section 4h.

The character number comparing control section 3g sends an execution command to the character number comparing execution section 3h, and then the character number comparing execution section 3h compares the number of characters of the character number counting memory section 4h with those of the character number memory section 4i. In the case that the number of characters of the character number counting memory section 4h is less than those of the character number memory section 4i, characters stored in the cutout character memory section 4e is transferred to the recognition character string memory section 4j. In the case that the character comparing execution section 3d detects the cutout ending character before the number of characters of the character number counting memory section 4h does not reach that of the character number memory section 4i, the number of characters of the character number counting memory section 4h is considered as the number of input characters. In addition, in the case that none of the cutout starting character, the output ending character, and the maximum number of cutout characters is input, all of the characters of the read character memory section 4d are transferred to the recognition character string memory section 4j. In this way, the character string which is cut out is once stored in the recognition character string memory section 4j, and after that the character string is sent out to the information processing device via the section 6 (FIG. 1).

Figure 6:
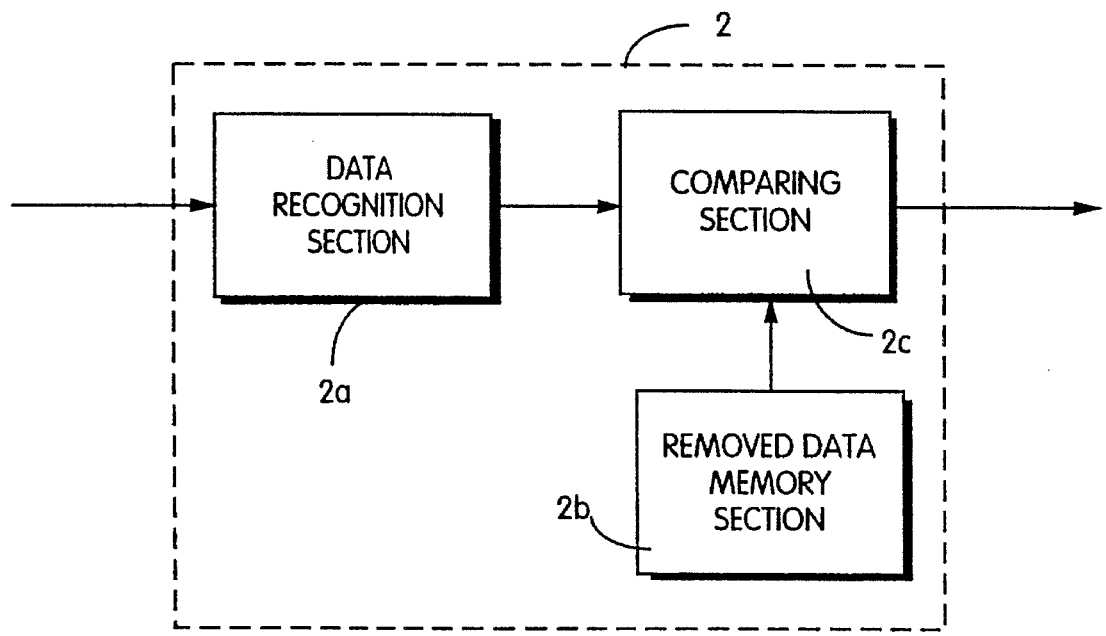
FIG. 6 is a block diagram showing main sections of a third example of the present invention.

FIG. 6 is a block diagram showing the control section 2 of a third example of the present invention. In FIG. 6, the control section 2 comprises a data recognition section 2a for recognizing data which is read, a removed data memory section 2b for storing characters and marks which are desired to be removed from the data which is read, and a comparing section 2c which compares the date which is read with the removed data and which removes and outputs the predetermined characters and marks from the data which is read. The same elements as those in FIG. 1 are marked with the same reference numerals, and the description thereof is omitted.

Figure 7:
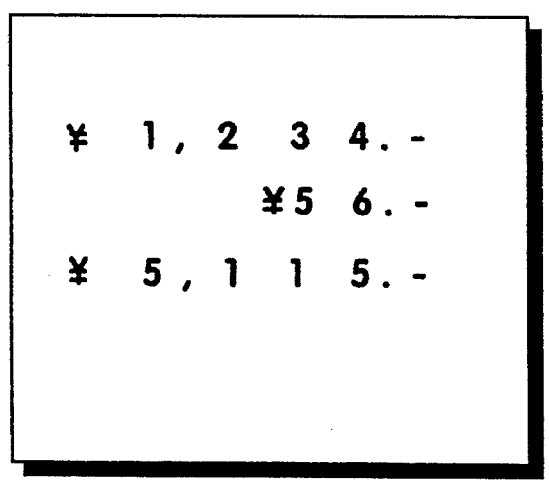
FIG. 7 is a diagram illustrating numeric value data printed on paper.
Figure 8:
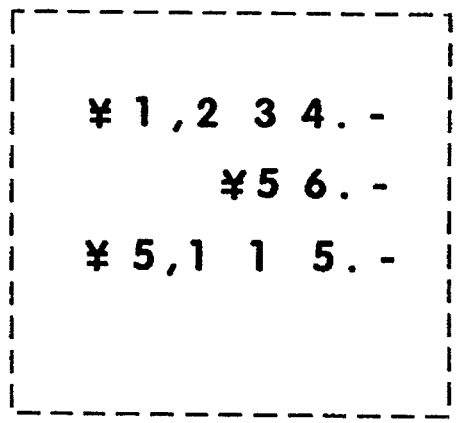
FIG. 8 is a diagram showing data read in the third example.
Figure 9:
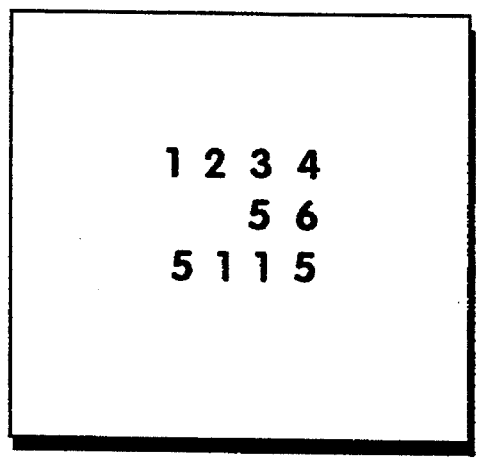
FIG. 9 is a diagram showing data transmitted in the third example.

According to this structure, when numeric value data (as shown in FIG. 7) printed on paper is read, data shown in FIG. 8 is stored in the data recognition section 2a. When marks such as "¥", ",", "." and "-" which are desired to be removed, are previously stored in the removed data memory section 2b, the comparing section 2c outputs only the numeric value data (FIG. 9) in which these marks are removed from the data of the data recognition section 2a. In this way, unnecessary characters and marks are removed from the data which is read and transmitted to the information processing device B.

Figure 10:
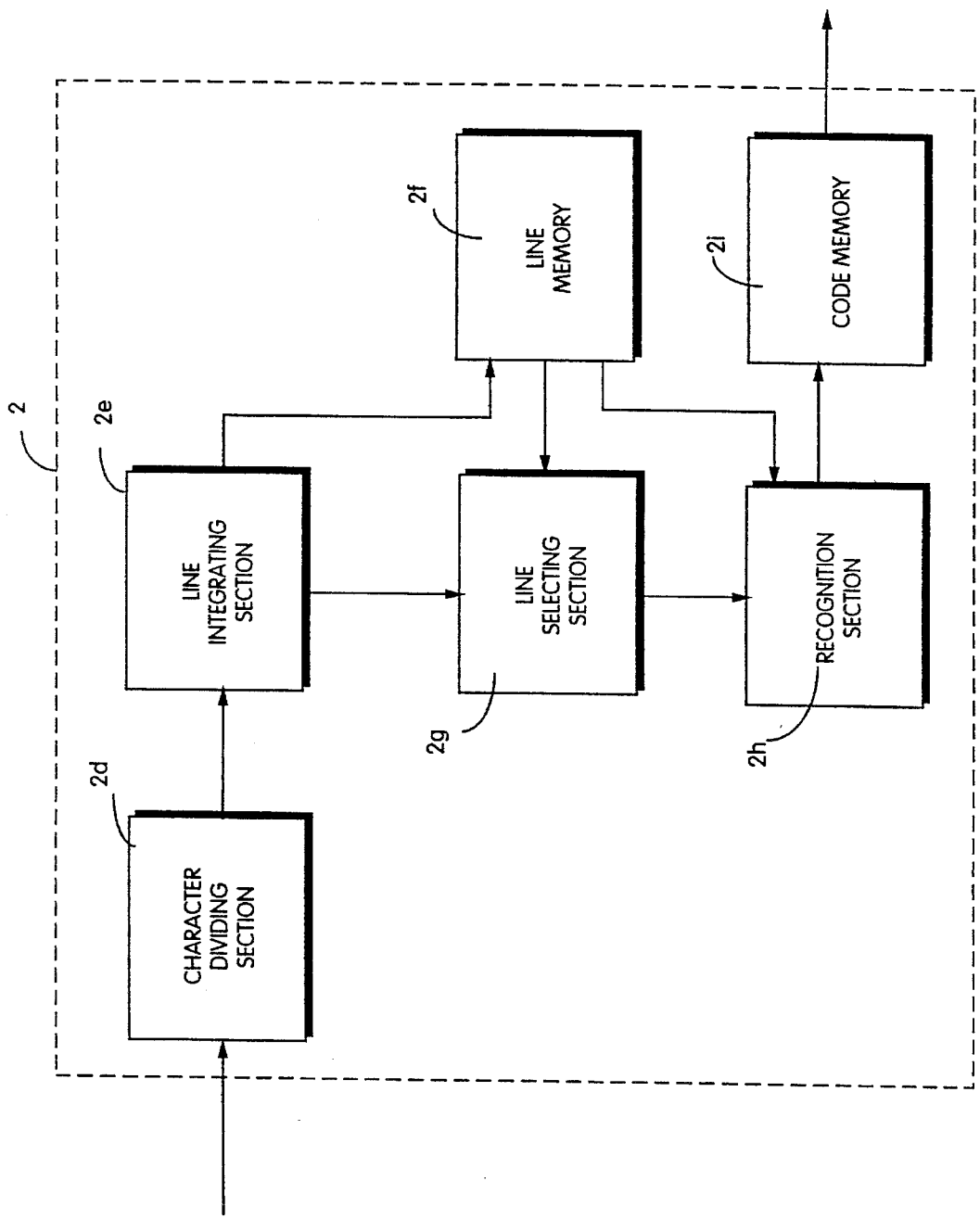
FIG. 10 is a block diagram showing main sections of a fourth example.

FIG. 10 is a block diagram showing the control section 2 of a fourth example of the present invention. In FIG. 10, the control section 3 comprises a character dividing section 2d for dividing data, which is read, into a character unit, a line integrating section 2e for integrating the divided character data into a line unit, a line memory 2f for storing character string data integrated as a line unit, a line selecting section 2g for selecting one line at the center of the character string with a plurality of lines stored in the line memory 2f, a character recognition section 2h for matching the data which is divided into 8 character unit with 8 recognition dictionary, and 8 code memory 2i for storing codes of candidate characters. The same elements as those in FIG. 1 are marked with the same reference numerals, end the description thereof is omitted.

Figure 13:
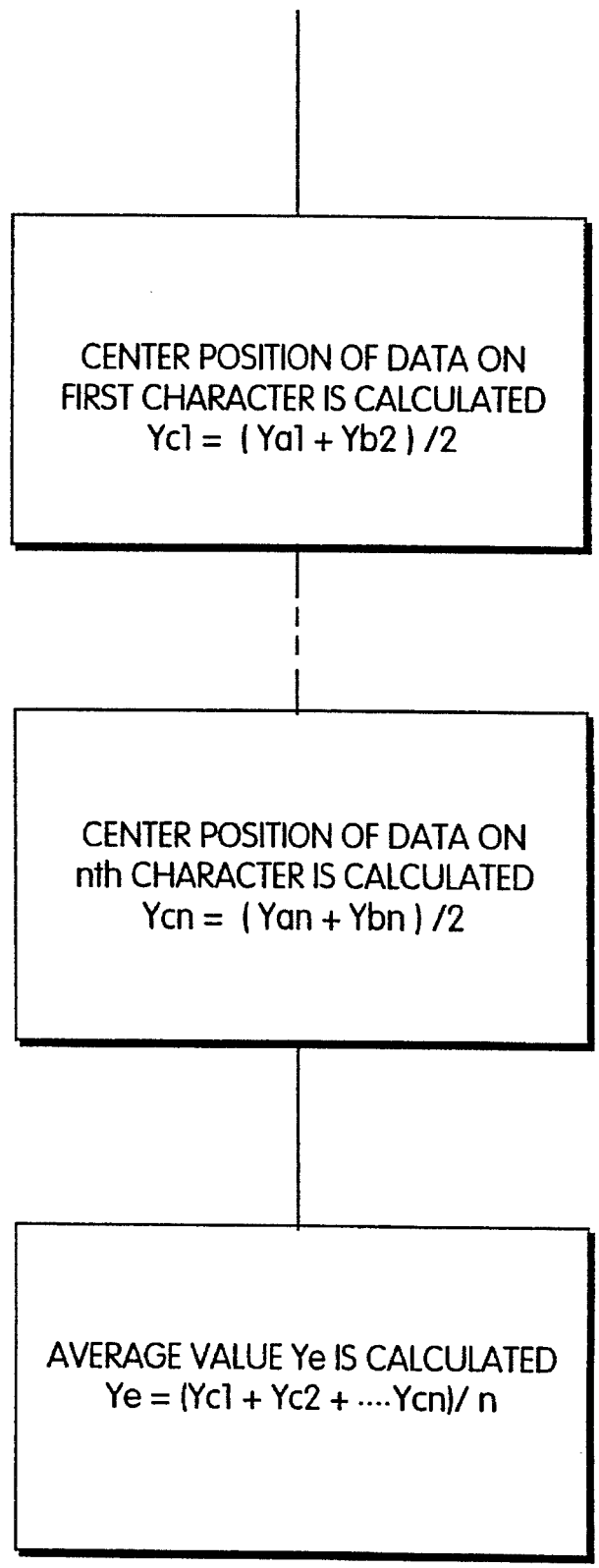
FIG. 13 is a flow chart showing a function of the fourth example.

According to this structure, the data which is read by the read section 1 (FIG. 1) is divided into a character unit by the character dividing section 2d, and integrated into a line unit by the line integrating section 2e to be stored in the line memory 2f. Here, when "one line selection" is ordered by the input section 5 (FIG. 1), a line selecting process is performed by the line selecting section 2g. In this line selecting process, as shown in a flow chart of FIG. 13, a line positioned at the center (center line) of the data which is read is selected.

Figure 11:
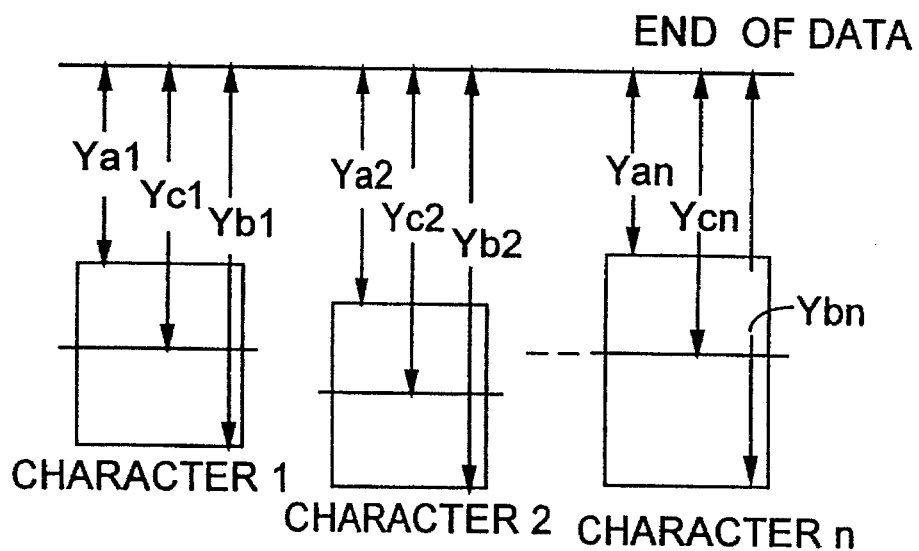
FIG. 11 is a diagram showing a function of the fourth example.
Figure 12:
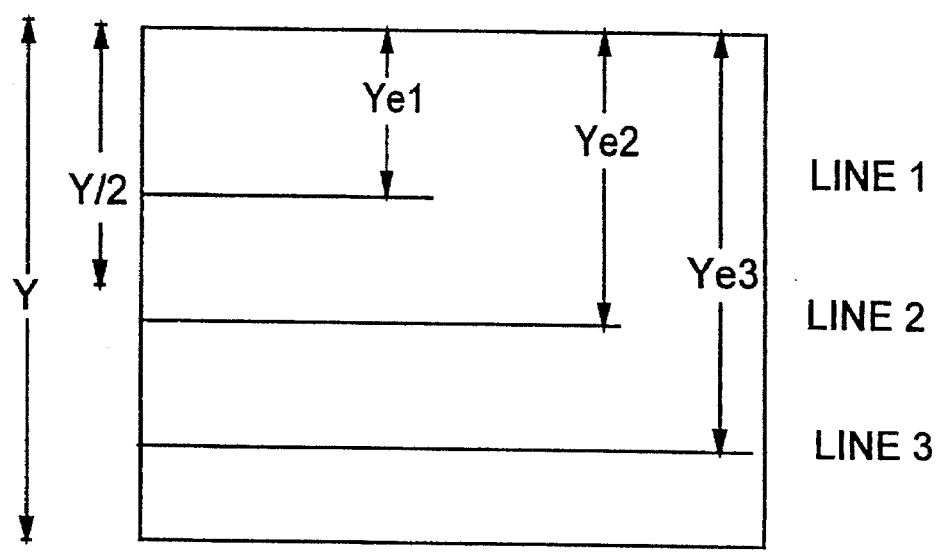
FIG. 12 is a diagram showing a function of the fourth example.
Figure 14:
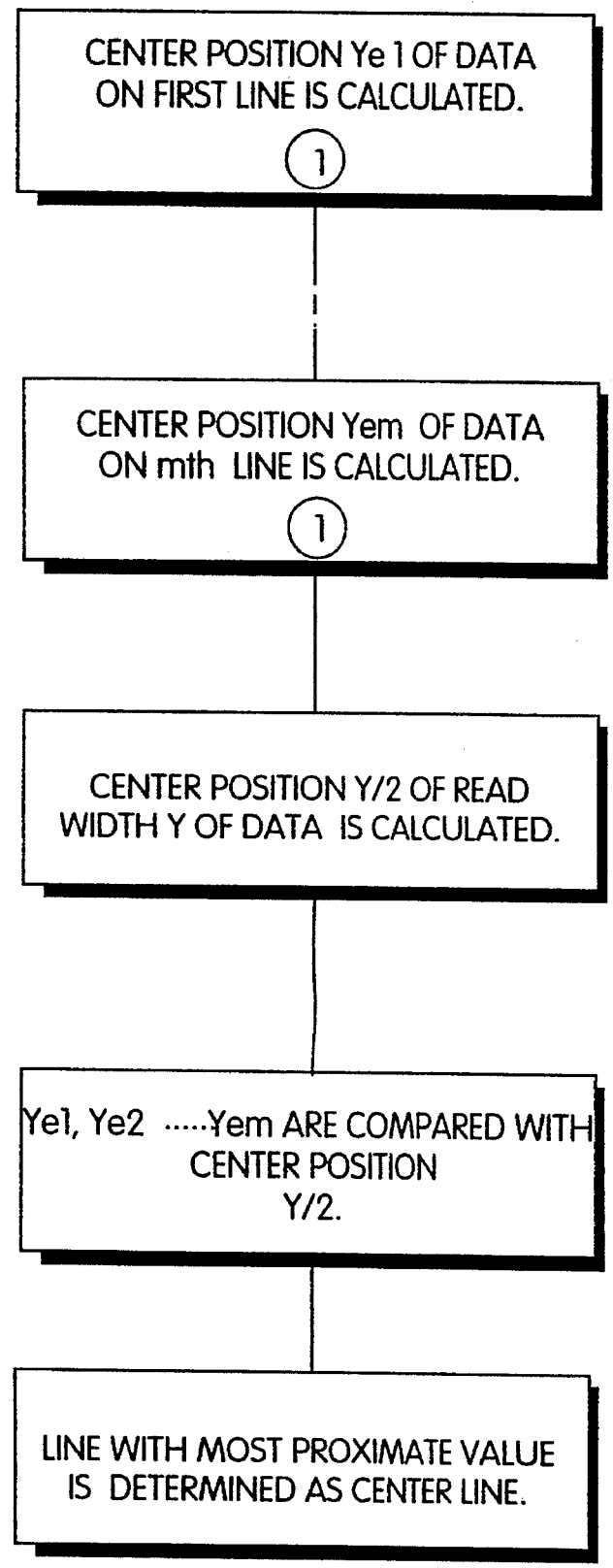
FIG. 14 is a flow chart showing a function of the fourth example.

The line selecting process will be described in detail. As shown in the flow chart of FIG. 13, as to each line integrated by the line integrating section 2e, the upper and position from the base line (end of data) of each character which belongs to the line, Ya1, Ya2, . . . , Yan and the lower and position from a base line of each character which belongs to the line, Yb1, Yb2, . . . , Ybn are detected as shown in FIG. 11. Then, the center positions of each character $Yc1=(Ya1+Yb1)/2$, $Yc2=(Ya2+Yb2)/2$, . . . , $Ycn=(Yan+Ybn)/2$ are calculated. In addition, the average value thereof $Ye=(Yc1+Yc2+ . . . +Ycn)/n$ is calculated. Next, as shown in a flow chart of FIG. 14, the center positions of each line Ye1, Ye2, . . . Yen are calculated. Each of Ye1, Ye2, . . . Yen is compared with the center position Y/2 of a width Y, whereby a line of which the center position is most proximate to the center position Y/2 of the width Y is determined as a center line. For example, in FIG. 12, the line 2 is determined as a center line.

As described above, when the center line is determined, the character recognition section 2h matches only character data corresponding to the center line among data stored in the line memory 2f with the recognition dictionary, and a code of the matched character is stored in the code memory 2i. When the command from the manual input section 5 (FIG. 1 ) is received, each character code stored in the code memory 2i is transmitted from the output section 6 (FIG. 1) to the information processing device B.

When the average value Ye is calculated as the average value of the minimum value Ymin of Ya1, Ya2, . . . , Yan and the maximum value Ymax of Yb1, Yb2, . . . , Ybn: $Ye=(Ymin+Ymax)/2$, processing speed is improved.

In this way, one line data at the center of read data can automatically be selected from read data which consists of a plurality of lanes, and any desired line data can also readily be selected from read data a which consists of plurality of lines.

Figure 15:
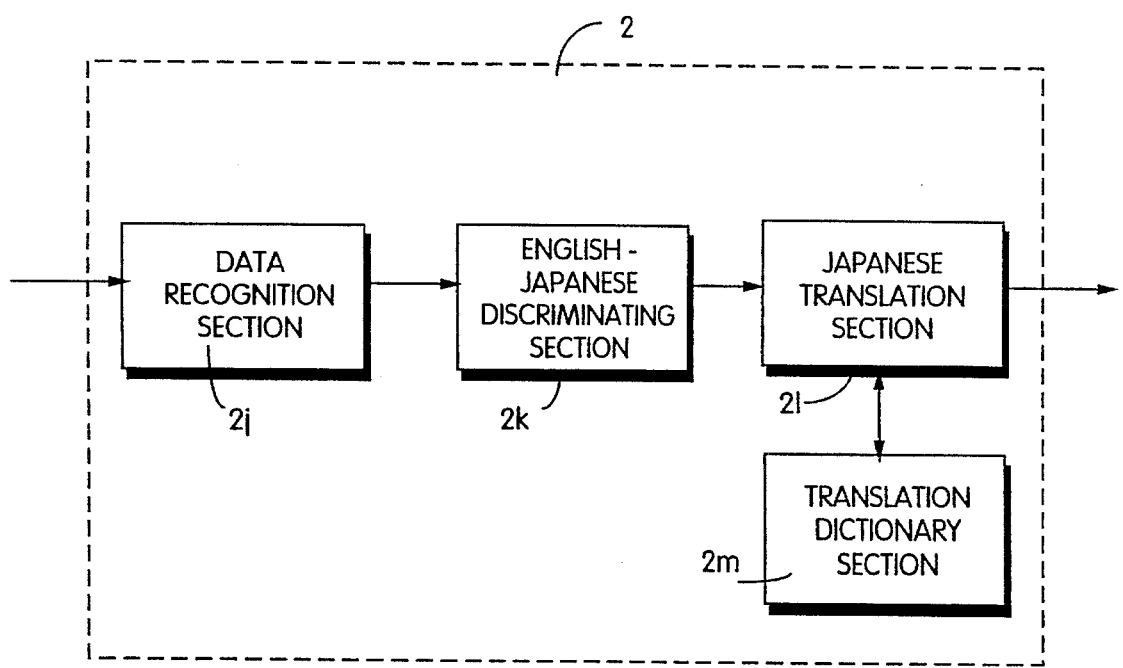
FIG. 15 is a block diagram showing main sections of a fifth example.

FIG. 15 is a block diagram showing the control section 2 of a fifth example of the present invention. The control section 2 comprises a data recognition section 2j for recognizing data which is read an English-Japanese discriminating section 2k for discriminating English from Japanese in recognized data and selecting only English, and Japanese translation section 2l for translating selected English into Japanese with reference to English-Japanese dictionary stored in a translation dictionary section 2m. The same elements as those in FIG. 1 are marked with the same reference numerals, and the description thereof is omitted.

According to this structure, when the data is read from the read section 1 (FIG. 1), character data is recognized by the data recognition section 2j with reference to the recognition dictionary. Only English is selected from the recognized character data by the English-Japanese discriminating section 2k and is translated into Japanese by the Japanese translation section 2l, and the translated character data is transmitted to the information processing device B via the output section 6.

In this case, it is preferred that only when the "translation mode" command is ordered from the input section 5 (FIG. 1), the data of the data recognition section 2j is input into the English-Japanese discriminating section 2k. In the case that there is no "translation mode" command, it is preferred that the data of the data recognition section 2i is directly input into the information processing device B via the output section 6.

As described above, the optical character reader can be provided with a translation function.

According to the present invention, the following effects can be obtained.

(1) In the case that the same character is repeatedly read, the same data can readily be provided to the information processing device by performing only one time read operation.

(2) Since there is no cable between the optical character reader and the information processing device, the use of the optical character reader can be widened.

(3) It becomes easy that arbitrary character strings are read from a plurality of stored data and arbitrary one line is read.

(4) Unnecessary characters and marks are automatically removed from the data which is read.

(5) A translation function can be provided to the optical character reader.

Various other modifications will be apparent to and can be readily made by those skilled in the art without departing from the scope and spirit of this invention. Accordingly, it is not intended that the scope of the claims appended hereto be limited to description as set forth herein, but rather that the claims be broadly construed.

What is claimed is:

1. An optical character reader comprising:

input means for inputting one of a plurality of commands;

reading means for reading recorded data;

memory means having a first region for storing read data, a second region for storing character code corresponding to the read data, and a third region for storing the character code;

output means for supplying at least one of the character code stored in the second region of the memory means and the character code stored in the third region of the memory means to an information processing device; and data processing means, when a read command is input from the input means, for storing the read data in the first region of the memory means, for converting the read data stored in the first region of the memory means into character code, and for storing the character code in the second region of the memory means, and, when a memory command is input from the input means, transferring the character code stored in the second region of the memory means to the third region of the memory means so as to store the character code stored in the second region of the memory means in the third region of the memory means until the next memory command is input from the input means, wherein the data processing means outputs the character code stored in the second region of the memory means, when a data transmission command is input from the input means, and wherein the data processing means outputs the character code stored in the third region of the memory means to the output means, when a memory data transmission command is input from the input means.

2. An optical character reader according to claim 1, wherein the data processing means outputs the character code stored in the second region of the memory means from the output means, when a transmission command is input from the input means.

3. An optical character reader according to claim 1, wherein the output means has conversion means for converting at least one of the character code stored in the second region of the memory means and the character code stored in the third region of the memory means into an infrared signal.

4. An optical character reader comprising:

input means for inputting one of a plurality of commands and for allowing a plurality of characters to be input;

reading means for reading recorded data;

memory means having a first region for storing the read data, a second region for storing a character data corresponding to the read data, a third region for storing one of character data cut out from the character data, a fourth region for storing a cutout starting character input from the input means, a fifth region for storing a cutout ending character input from the input means, and a sixth region for storing character data cut out from the character data, output means for supplying the character data stored in the sixth region of the memory means to an information processing device; and data processing means, when a read command is input from the input means, for storing the read data in the first region of the memory means, for converting the read data stored in the first region of the memory means into character data, for storing the character data in the second region of the memory means, for cutting out one of the character data from the character data stored in the second region of the memory means, for storing the one of the character data in the third region of the memory means, for specifying character data to be cut out from the character data stored in the second region of the memory means by comparing the character stored in the third region of the memory means with the cutout starting character stored in the fourth region of the memory means and the cutout ending character stored in the fifth region of the memory means so as to cut out the specified character data from one character corresponding to the cutout starting character to one character corresponding to the cutout ending character data in the second region of memory means, and for storing the specified character data in the sixth region of the memory means.

5. An optical character reader according to claim 4, wherein the data processing means outputs the character data stored in the sixth region of the memory means from the output means.

6. An optical character reader according to claim 4, wherein the output means has conversion means for converting the character data stored in the sixth region of the memory means into an infrared signal.

7. An optical character reader according to claim 4, wherein the input means further allows a plurality of numerals to be input;

the memory means further has a seventh region for storing a character number input from the input means and an eighth region for storing a character number counter; and when a read command is input from the input means, the data processing means cuts out the one of the character data from the character data stored in the second region of the memory means and stores the one of the character data in the third region of the memory means, increases the character number counter stored in the eighth region of the memory means one by one every time the one of the character data is cut out, specifies character data to be cut out from the character data stored in the second region of the memory means by comparing the one of the character data stored in the third region of the memory means with the cutout starting character stored in the fourth region of the memory means and the cutout ending character stored in the fifth region of the memory means and by comparing the character number stored in the seventh region of the memory means with the character number counter stored in the eighth region of the memory means, and stores the specified character data in the sixth region of the memory means.

8. An optical character reader comprising:

input means for inputting one of a plurality of commands;

reading means for reading recorded data;

memory means having a first region for storing the read data, a second region for storing character data corresponding to the read data, a third region for storing predetermined character data to be removed, and a fourth region for storing character data in which the character data to be removed is removed from the character data;

output means for supplying the character data stored in the fourth region of the memory means to an information processing device; and data processing means, when a read command is input from the input means, for storing the read data in the first region of the memory means, for converting the read data stored in the first region of the memory means into character data, for storing the character data in the second region of the memory means, for specifying character data in which the all predetermined character data to be removed is/are removed from the character data stored in the second region of the memory means by comparing the character data stored in the second region of the memory means with the predetermined character data to be removed, which is stored in the third region of the memory means, and for storing the specified character data in the fourth region of the memory means.

9. An optical character reader according to claim 8, wherein the data processing means outputs the character data stored in the fourth region of the memory means from the output means, when a transmission command is input from the input means.

10. An optical character reader according to claim 8, wherein the output means has a conversion means for converting the character data stored in the fourth region of the memory means into an infrared signal.

11. An optical character reader comprising:

input means for inputting one of a plurality of commands;

reading means for reading recorded data;

memory means having a first region for storing the read data, a second region for storing line data converted from the read data, and a third region for storing the character data converted from the line data;

output means for supplying the character data stored in the third region of the memory means to an information processing device; and data processing means, when a read command is input from the input means, for storing the read data in the first region of the memory means, for converting the read data stored in the first region of the memory means to one or more line data processed with a line as a unit, for storing the one or more line data in the second region of the memory means, for specifying one line data from the one or more line data stored in the second region of the memory means on the basis of a relative position of the line data with respect to the read data, for converting the specified line data to character data, and for storing the character data in the third region of the memory means.

12. An optical character reader according to claim 11, wherein the data processing means outputs the character data stored in the third region of the memory means from the output means, when a transmission command is input from the input means.

13. An optical character reader according to claim 11, wherein the output means has a conversion means for covering the character data stored in the third region of the memory means to an infrared signal.

14. An optical character reader comprising:

input means for inputting one of a plurality of commands;

reading means for reading recorded data, memory means having a first region for storing the read data, a second region for storing character data corresponding to the read data, a third region for storing character data converted from the character data, and a fourth region for storing a translation dictionary;

output means for supplying the character data stored in the third region of the memory means to an information processing device; and data processing means, when a read command is input from the input means, for storing the read data in the first region of the memory means, for converting the read data stored in the first region of the memory means into character data, for storing the character data in the second region of the memory means, for selecting character data of a specific language from the character data stored in the second region of the memory means based on the result of a comparison of the character data with data of the translation dictionary, for converting the selected character data into character data of another language with reference to the translation dictionary stored in the fourth region of the memory means, and for storing the converted character data in the third region.

15. An optical character reader according to claim 14, wherein the data processing means outputs the character data stored in the third region of the memory means from the output means, when a transmission command is input from the input means.

16. An optical character reader according to claim 14, wherein the output means has conversion means for covering the character data stored in the third region of the memory means into an infrared signal.

* * * * *